(12) United States Patent
Coretto et al.

(10) Patent No.: US 12,429,069 B2
(45) Date of Patent: Sep. 30, 2025

(54) VALVE SYSTEMS

(71) Applicant: Hamilton Sundstrand Corporation (HSC), Charlotte, NC (US)

(72) Inventors: August M. Coretto, Windsor, CT (US); Ryan Prescott Susca, Windsor, CT (US); Francis P. Marocchini, Somers, CT (US); Sachin Ramprashad, West Hartford, CT (US); Leo J. Veilleux, Jr., Wethersfield, CT (US)

(73) Assignee: Hamilton Sundstrand Corporation (HSC), Charlotte, NC (US)

( * ) Notice: Subject to any disclaimer, the term of this patent is extended or adjusted under 35 U.S.C. 154(b) by 67 days.

(21) Appl. No.: 18/376,103

(22) Filed: Oct. 3, 2023

(65) Prior Publication Data
US 2025/0109755 A1    Apr. 3, 2025

(51) Int. Cl.
*F15B 13/04* (2006.01)
*F16K 11/07* (2006.01)

(52) U.S. Cl.
CPC ...... *F15B 13/0402* (2013.01); *F16K 11/0708* (2013.01)

(58) Field of Classification Search
CPC ... F15B 13/0402; F16K 11/07; F16K 11/0708
See application file for complete search history.

(56) References Cited

U.S. PATENT DOCUMENTS

| | | | |
|---|---|---|---|
| 3,736,958 A | 6/1973 | Rostad | |
| 4,041,983 A * | 8/1977 | Bianchetta | F15B 13/0402 91/461 |
| 5,797,294 A | 8/1998 | Bohner et al. | |
| 6,823,669 B2 | 11/2004 | Kogan et al. | |
| 7,200,993 B2 | 4/2007 | Khalil et al. | |
| 8,096,321 B2 | 1/2012 | Goll | |
| 2018/0141586 A1 | 5/2018 | Christ | |

FOREIGN PATENT DOCUMENTS

| | | |
|---|---|---|
| EP | 4215762 A1 | 7/2023 |
| JP | 2007239751 A | 9/2007 |

OTHER PUBLICATIONS

Partial European Search Report for EP Application No. 24204223.2, Dated Jan. 22, 2025, pp. 13.
Extended European Search Report for European patent application No. 24204223.2, dated Apr. 14, 2025, 12 pages.

\* cited by examiner

*Primary Examiner* — Kelsey E Cary
(74) *Attorney, Agent, or Firm* — Kinney & Lange, P.A.

(57) ABSTRACT

A system can include a first controllable valve configured to output a control pressure on one or more first pressure control lines, a second controllable valve configured to output a control pressure on one or more second pressure control lines, a transfer valve in fluid communication with the first controllable valve and the second controllable valve, and a hydraulic centering system operatively associated with and/or forming part of the transfer valve. The transfer valve can be configured to move between a first position, a second position, and a third position. The hydraulic centering system can be configured to maintain the transfer valve in the first position.

15 Claims, 4 Drawing Sheets

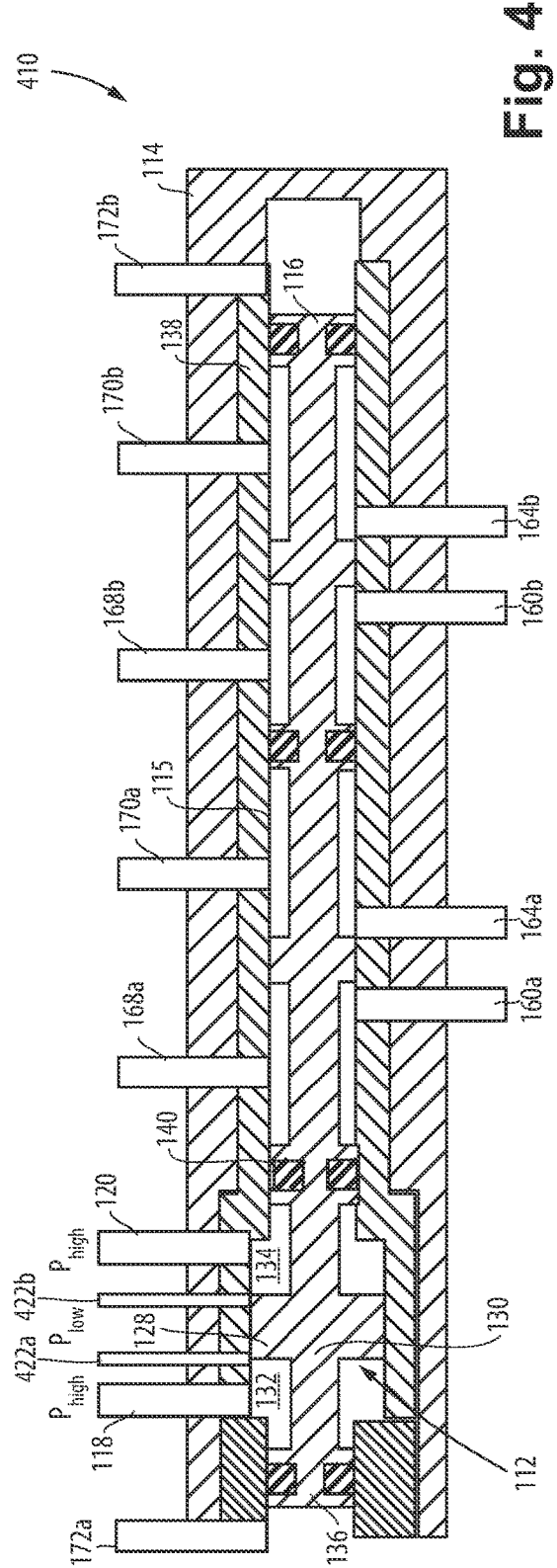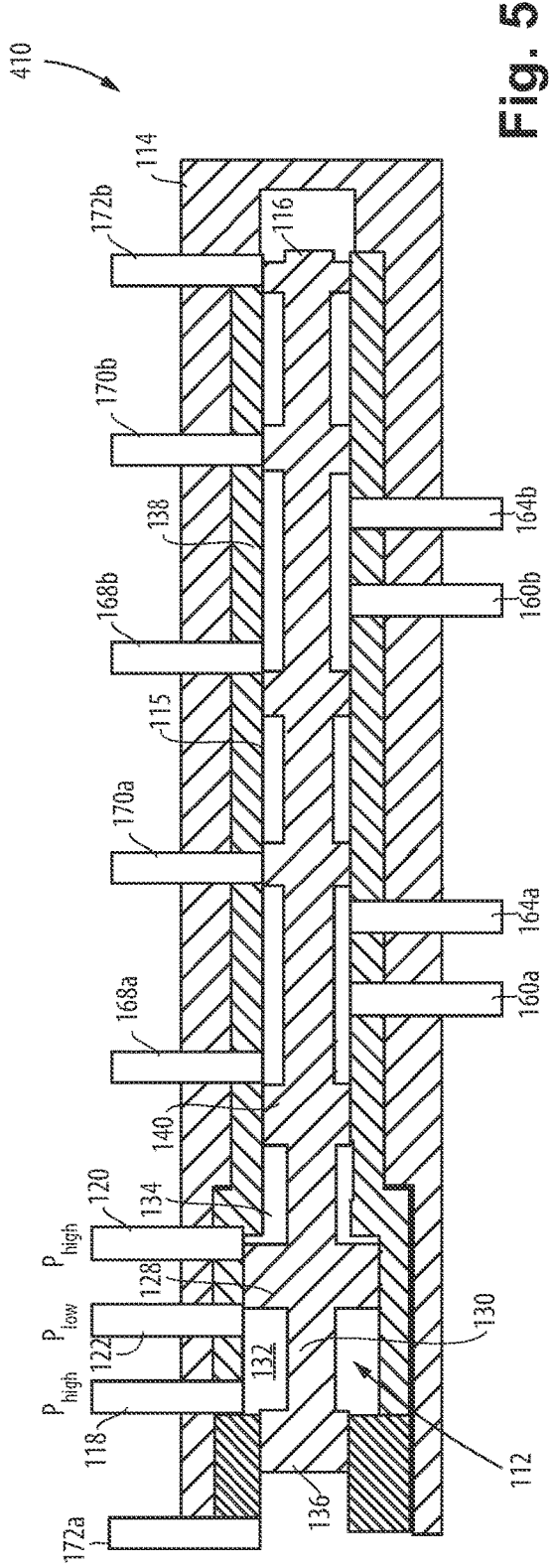

VALVE SYSTEMS

FIELD

This disclosure relates to valve systems.

BACKGROUND

Certain transfer valves have used springs or modulating electro-mechanical interconnect devices (EMIDs) to accomplish a center position with no hard stop. Such devices increase the weight and complexity of valve systems.

Such conventional methods and systems have generally been considered satisfactory for their intended purpose. However, there is still a need in the art for improved valve systems. The present disclosure provides a solution for this need.

SUMMARY

A system can include a first controllable valve configured to output a control pressure on one or more first pressure control lines, a second controllable valve configured to output a control pressure on one or more second pressure control lines, a transfer valve in fluid communication with the first controllable valve and the second controllable valve, and a hydraulic centering system operatively associated with and/or forming part of the transfer valve. The transfer valve can be configured to move between a first position, a second position, and a third position. The hydraulic centering system can be configured to hydraulically bias the transfer valve in the first position.

In certain embodiments, the hydraulic centering system can be configured to maintain the transfer valve to the first position. The hydraulic centering system can be configured to hydraulically bias the transfer valve in opposite directions to maintain the transfer valve in the first position.

In certain embodiments, the transfer valve can include a housing and a spool positioned within the housing. The spool can be configured to move within the housing between the first position, the second position, and the third position.

The hydraulic centering system can further include a first high pressure centering port defined through the housing, a second high pressure centering port defined through the housing, and at least one low pressure centering port defined through the housing between the first high pressure centering port and the second high pressure centering port. The first high pressure centering port can be configured to be in fluid communication with a first centering control pressure line, and the second high pressure centering port can be configured to be in fluid communication with a second centering pressure control line.

The spool can further include a centering land extending radially outwardly from a shaft of the spool. The hydraulic centering system land can partially define a first cavity on a first side of the centering land which is in fluid communication with the first high pressure centering port, and a second cavity on a second side of the centering land in fluid communication with the second high pressure centering port. The centering land can be configured to block the at least one low pressure centering port in the first position.

In certain embodiments, the system further includes a first land extending radially from the shaft of the spool to slidably seal to the housing and a second land extending radially from the shaft of the spool to slidably seal to the housing. The centering land can be positioned between the first land and the second land. The first cavity can be at least partially defined between the first land and the centering land and the second cavity can be at least partially defined between the centering land and the second land. The first land, the second land, and centering land can each include a respective seal configured to seal to an inner diameter of the housing.

In certain embodiments, the at least one low pressure centering port can include a first low pressure centering port and a second low pressure centering port positioned between the first high pressure centering port and the second high pressure centering port. The first low pressure centering port and the second low pressure centering port can be configured to be blocked by the centering land in the first position.

The first position can be between the second position and the third position. The first position can be centered between the second position and the third position. In a first mode, a pressure differential across the transfer valve can be within a first mode threshold such that the centering system hydraulically biases the transfer valve in the first position or about the first position. In a second mode, the pressure differential across the transfer valve can be outside the first mode threshold such that the centering system does not maintain the transfer valve in the first position and the transfer valve is moved to the second position. In a third mode, the pressure differential across the transfer valve can be outside the first mode threshold such that the centering system does not maintain the transfer valve in the first position and the transfer valve is moved to the third position.

In accordance with at least one aspect of this disclosure, a valve can include a housing, a spool, and a hydraulic centering feature. The housing can include a first high pressure centering port, a second high pressure centering port, and at least one low pressure centering port between the first high pressure centering port and the second high pressure centering port. The spool can include a shaft and can be configured to move within the housing between a first position, a second position, and a third position. The hydraulic centering land can be operatively associated with or forming part of the spool and can extend radially outward relative to the shaft of the spool. The hydraulic centering land can be configured to hydraulically bias the spool in the first position. The first position can be between the second position and the third position.

In certain embodiments, the centering land can be configured to be between the first high pressure centering port and the second high pressure centering port. The centering land can partially define a first cavity on a first side of the centering land which is in fluid communication with the first high pressure centering port, and a second cavity on a second side of the centering land in fluid communication with the second high pressure centering port. The centering land can be configured to block the at least one low pressure centering port in the first position.

In certain embodiments, the centering land can be configured such that if the spool moves toward the second position, the at least one low pressure centering port is progressively exposed to the first cavity to cause a reduction in pressure in the first cavity to the second cavity, resulting in a restorative force acting on the centering system toward the first position. The centering land can be configured such that if the spool moves toward the third position, the at least one low pressure centering port is progressively exposed to the second cavity to cause a reduction in pressure in the second cavity to the first cavity, resulting in the restorative force acting on the centering system toward the first position.

In certain embodiments, the valve can further include a seal on an outer surface of the centering land. The seal can seal against the housing to prevent leakage to the at least one low pressure centering port.

In accordance with at least one aspect of this disclosure, a valve can include a housing, a spool, and one or more hydraulic centering features. The spool can be configured to move within the housing between a first position, a second position, and a third position. The one or more hydraulic centering features can be associated with the housing and/or the spool and configured to hydraulically bias the spool in the first position. The first position can be between the second position and the third position.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

FIG. 4 is a cross-sectional view of an embodiment of a transfer valve in accordance with this disclosure, shown in a first position;

FIG. 5 is a cross-sectional view of an embodiment of a transfer valve in accordance with this disclosure shown in a second position.

DETAILED DESCRIPTION

Figure 1:
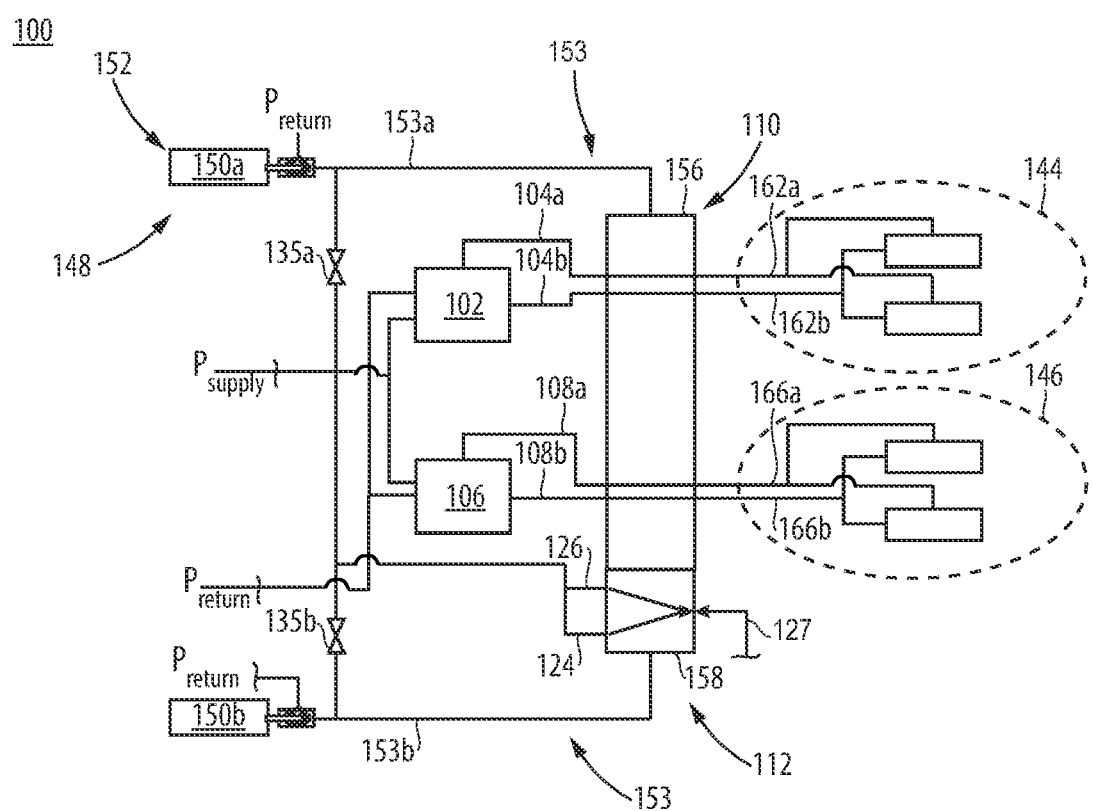
FIG. 1 is a schematic view of an embodiment of a system in accordance with this disclosure, shown in an embodiment of a first mode and having an embodiment of a transfer valve is in a first position.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2-6.

Figure 6:
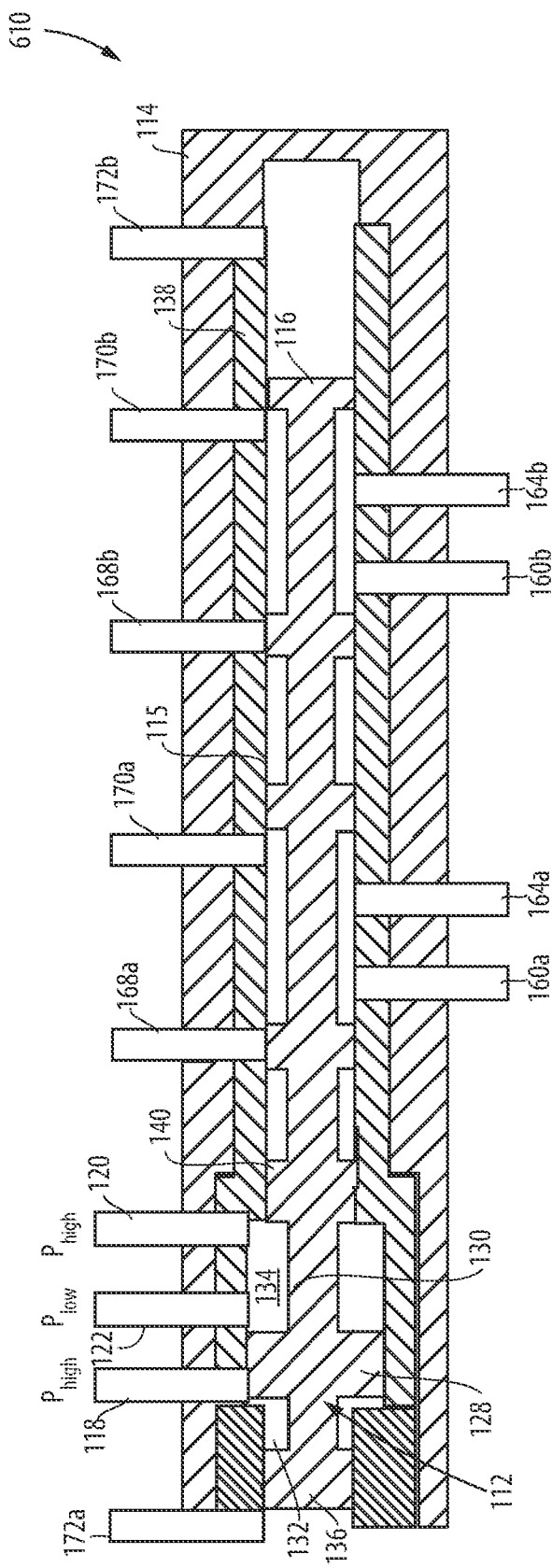
FIG. 6 is a cross-sectional view of the embodiment of FIG. 5, shown in a third position.

With reference to FIG. 1, a system 100 can include a first controllable valve 102 configured to output a control pressure on one or more first pressure control lines 104a, 104b, a second controllable valve 106 configured to output a control pressure on one or more second pressure control lines 108a, 108b, a transfer valve 110 in fluid communication with the first controllable valve 102 and the second controllable valve 106, and a hydraulic centering system 112 operatively associated with and/or forming part of the transfer valve 110. The transfer valve 110 can be configured to move between a first position (e.g. as shown in FIGS. 1-4), a second position (e.g., as shown in FIG. 5), and a third position (e.g., as shown in FIG. 6). The hydraulic centering system 112 can be configured to hydraulically bias the transfer valve 110 in the first position (e.g., in a first mode of operation where both controllable valves 102, 106 are functioning properly).

In certain embodiments, the hydraulic centering system 112 can be configured to maintain the transfer valve 110 to the first position. The hydraulic centering system 112 can be configured to hydraulically bias the transfer valve 110 in opposite directions to maintain the transfer valve 110 in the first position.

Figure 2:
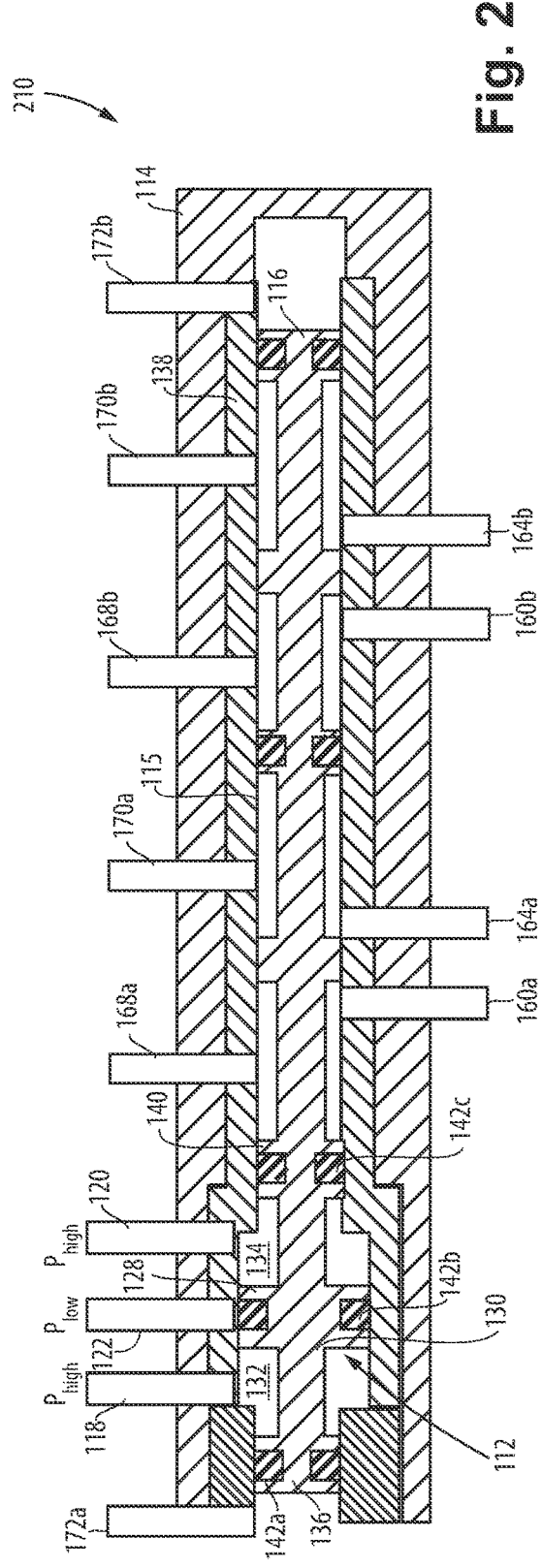
FIG. 2 is a cross-sectional view of an embodiment of a transfer valve in accordance with this disclosure, shown in a first position.

Referring additionally to FIG. 2, in certain embodiments, a transfer valve 210 can include a housing 114 and a spool 116 positioned within the housing 114. The spool 116 can be configured to move within the housing 114 between the first position (e.g., as shown in FIG. 2), the second position (e.g., as shown in FIG. 5), and the third position (e.g., as shown in FIG. 6).

The hydraulic centering system 112 can further include a first high pressure centering port 118 defined through the housing 114, a second high pressure centering port 120 defined through the housing 114, and at least one low pressure centering port 122 defined through the housing 114 between the first high pressure centering port 118 and the second high pressure centering port 120. The first high pressure centering port 118 can be configured to be in fluid communication with a first centering control pressure line 124 (e.g., as shown in FIG. 1), and the second high pressure centering port 120 can be configured to be in fluid communication with a second centering pressure control line 126 (e.g., as shown in FIG. 1). Low pressure centering port 122 can be configured to be in fluid communication with low pressure line 127 (e.g., as shown in FIG. 1) such that when the valve 110 moves to either side, one of the high pressure ports 118, 120 begins to flow into the low pressure line 127 through the low pressure port 122, redosing the pressure and centering the valve 110.

The spool 116 can further include a centering land 128 extending radially outwardly from a shaft 130 of the spool 116. The spool 116 can be configured to at least partially seal to an inner dimension 115 of the housing 114 to reduce or prevent leakage. The hydraulic centering system 112 land can partially define a first cavity 132 on a first side of the centering land 128 which is in fluid communication with the first high pressure centering port 118, and a second cavity 134 on a second side of the centering land 128 in fluid communication with the second high pressure centering port 120.

In certain embodiments, the spool 116 can include a first land 136 extending radially from the shaft 130 of the spool 116 to slidably seal to the housing 114 and a second land 140 extending radially from the shaft 130 of the spool 116 to slidably seal to the housing 114. The centering land 128 can be positioned between the first land 136 and the second land 140. In certain embodiments, e.g., as shown, the first cavity 132 can be partially defined by a first land 136, a valve sleeve 138, and the shaft 130 of the spool 116. In certain embodiments, e.g., as shown, the second cavity 134 can be partially defined by a second land 140, the valve sleeve 138, and the shaft 130 of the spool 116. The centering land 128 can be configured to block the at least one low pressure centering port 122 in the first position. In certain embodiments, the centering land has a wider outer dimension (e.g., diameter) than the other lands (e.g., first and second lands and all other lands can have the same outer dimension)

The first cavity 132 can be at least partially defined between the first land 136 and the centering land 128 and the second cavity 134 can be at least partially defined between the centering land 128 and the second land 140. The first land 136, the second land 140, and centering land 128 can each include a respective seal 142*a-c* configured to seal to an inner dimension 115 of the housing 114.

Figure 3:
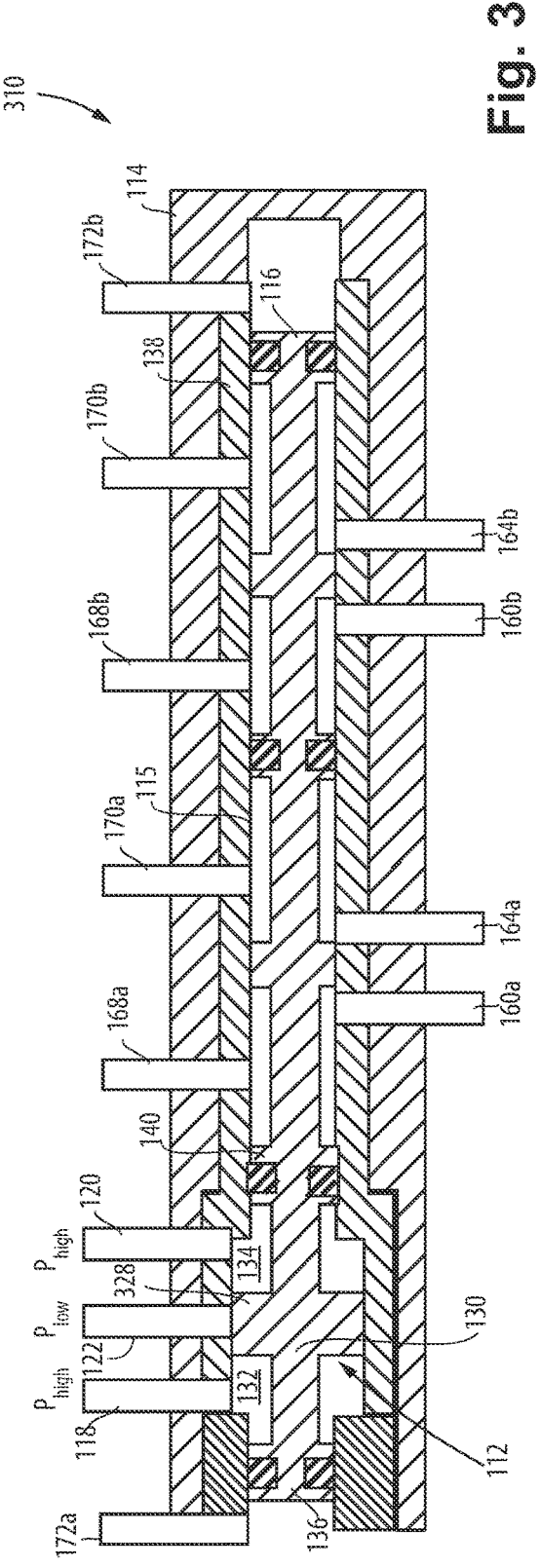
FIG. 3 is a cross-sectional view of an embodiment of a transfer valve in accordance with this disclosure, shown in a first position.

With reference to FIG. 3, certain embodiments of a transfer valve 310 can include a centering land 328 that does not include any seals (e.g., as long as a desired sealing effect is achieved for the proper function of the transfer valve 210 and/or the centering system 112). As shown, the transfer valve 310 can be otherwise the same or similar to the transfer valve 210 of FIG. 2.

With reference to FIG. 4, in certain embodiments of a transfer valve 410, the at least one low pressure centering port 122 can include a first low pressure centering port 422*a* and a second low pressure centering port 422*b* positioned between the first high pressure centering port 118 and the second high pressure centering port 120. The first low pressure centering port 422*a* and the second low pressure centering port 422*b* can be configured to be blocked by the centering land 128 in the first position. As shown, the transfer valve 410 can be otherwise the same or similar to the transfer valve 210 of FIG. 2 or the transfer valve 310 of FIG. 3.

The first position (e.g., as shown in FIG. 2) can be between the second position (e.g., as shown in FIG. 5) and the third position (e.g., as shown in FIG. 6). The first position can be centered between the second position and the third position. In a first mode (e.g., as shown in FIGS. 1 and 2), a pressure differential across the transfer valve 110 can be within a first mode threshold (e.g., about zero, and/or below the maximum pressure differential that generates a maximum centering force between the first cavity 132 and the second cavity 134) such that the centering system 212 maintains the transfer valve 110 in the first position or about the first position. In a second mode (e.g., as shown in FIG. 5), the pressure differential across the transfer valve 110 can be outside the first mode threshold such that the centering system 112 does not maintain the transfer valve 110 in the first position and the transfer valve is moved to the second position. In a third mode (e.g., as shown in FIG. 6), the pressure differential across the transfer valve 110 can be outside the first mode threshold such that the centering system 112 does not maintain the transfer valve 110 in the first position and the transfer valve 110 is moved to the third position.

In accordance with at least one aspect of this disclosure, certain embodiments can be or include a transfer valve. Referring to FIG. 2, for example, one or more embodiments of the transfer valve 210 can include a housing 114, a spool 116, and a hydraulic centering land 128. The housing 114 can include a first high pressure centering port 118, a second high pressure centering port 120, and at least one low pressure centering port 122 between the first high pressure centering port 118 and the second high pressure centering port 120. The spool 116 can include a shaft 130 and can be configured to move within the housing 114 between a first position, a second position, and a third position. The hydraulic centering land 128 can be operatively associated with or forming part of the spool 116 and can extend radially outward relative to the shaft 130 of the spool 116. The hydraulic centering land 128 can be configured to maintain the spool 116 in the first position. The first position can be between the second position and the third position.

With reference to FIG. 4, the at least one low pressure centering port 122 includes a first low pressure centering port 422*a* and a second low pressure centering port 422*b* between the first high pressure centering port 118 and the second high pressure centering port 120, wherein the first low pressure centering port 122*a* and the second low pressure centering port 122*b* are configured to be blocked by the spool 116 in the first position.

In certain embodiments, the centering land 128 can be configured to be between the first high pressure centering port 118 and the second high pressure centering port 120. The centering land 128 can partially define a first cavity 132 on a first side of the centering land 128 which is in fluid communication with the first high pressure centering port 118, and a second cavity 134 on a second side of the centering land 128 in fluid communication with the second high pressure centering port 120. The centering land 128 can be configured to block the at least one low pressure centering port 122 in the first position.

In certain embodiments, the centering land 128 can be configured such that if the spool 116 moves toward the second position (e.g., as shown in FIG. 5), the at least one low pressure centering port 122 is progressively exposed to the first cavity 132 to cause a reduction in pressure in the first cavity 132 to the second cavity 134, resulting in a restorative force acting on the centering system 112 toward the first position. The centering land 128 can be configured such that if the spool 116 moves toward the third position (e.g., as shown in FIG. 6), the at least one low pressure centering port 122 is progressively exposed to the second cavity 134 to cause a reduction in pressure in the second cavity 134 to the first cavity 132, resulting in the restorative force acting on the centering system 112 toward the first position.

In certain embodiments, the valve 110 can further include a seal 142 on an outer surface of the centering land 128. The seal can seal against the housing to prevent leakage to the at least one low pressure centering port 122. One or more embodiments of a transfer valve 210, 310, 410, 510 can include any other suitable features disclosed herein, e.g., described above.

In accordance with at least one aspect of this disclosure, a valve 110 can include a housing 114, a spool 116, and one or more hydraulic centering features (e.g., one or more ports and/or lands, e.g., as described above, configured to provide hydraulic centering). The spool 116 can be configured to move within the housing 114 between a first position, a second position, and a third position. The one or more hydraulic centering features can be associated with the housing 114 and/or the spool 116 and configured to hydraulically bias the spool toward the first portion to hydraulically bias the spool in the first position. The first position can be between the second position and the third position. No other structure (e.g., springs, etc.) are required for centering the transfer valve 110. Certain embodiments, e.g., as shown only include the hydraulic centering system 112.

With reference to FIG. 1, the transfer valve 110 can be configured to fluidly communicate the one or more first pressure control lines 104*a*, 104*b* to a first functional system 144 and the one or more second pressure control lines 108*a*, 108*b* to a second functional system 146 in the first position (e.g., as shown).

In a second mode and a third mode (e.g., as shown in FIGS. 5 and 6), the transfer valve 110 can be configured to be controlled by a transfer control system 148 (e.g., as shown in FIG. 1), which includes at least one transfer control valve 150, such that the at least one transfer control valve outputs a transfer control pressure on one or more third pressure control lines 153, wherein the at least one transfer control valve 150 is in fluid communication with the transfer valve 110 via the one or more third pressure control lines 153 to control a position of the transfer valve 110 via the transfer control pressure on the one or more third pressure control lines 153. The transfer control pressure on the one or more third pressure control lines 153 is higher than a centering pressure along one or more center pressure control lines 154. This allows the transfer control system 148 to overcome the centering system 112 in the event of failure of either of the first and second controllable valves 102, 106. The transfer control system 148 can further include a controller (not shown) configured to control the at least one transfer control valve 150 to change the position of the transfer valve 110. In the first mode, the first controllable valve 102 controls the first functional system 144 and the second controllable valve 106 controls the second functional system 146.

With reference to FIG. 5, in a second mode, the controller can be configured to control the at least one transfer control valve 150 to position the transfer valve 510 in the second position, wherein the transfer valve 510 is configured to fluidly communicate the one or more first pressure control lines 104a, 104b to the first functional system 144 and the second functional system in the second position 146 (e.g. communication along the one or more second pressure control lines 108a, 108b is blocked). In the second mode, the first controllable valve 103 controls both the first and second functional systems 144, 146.

With reference to FIG. 6, in a third mode, the controller is configured to control the at least one transfer control valve 150 to position the transfer valve 610 in the third position, wherein the transfer valve 610 is configured to fluidly communicate the one or more second pressure control lines 108a, 108b to the first functional system 144 and the second functional system 146 in the third position (e.g., communication along the one or more first pressure control lines 104a, 104b is blocked). In the third mode, the second controllable valve 106 controls both the first and second functional systems 144, 146.

The first and second controllable valves 102, 106 can be EHSVs. The first and second functional systems 144, 146 can include a plurality of actuators. The at least one transfer control valve 150 includes a first solenoid 153a and a second solenoid 153b.

The one or more third pressure control lines 153 include a first solenoid control line 153a and a second solenoid control line 153b, wherein the first solenoid control line 153a is connected to a first portion of the transfer valve 156 and the second solenoid control line 153b is connected to a second portion of the transfer valve 158 to control a pressure differential across the transfer valve 110 to control the position of the transfer valve 110 between the second and third positions.

With reference to FIGS. 2-6, the housing 114 can include one or more first functional system ports 160a, 160b configured to fluidly connect to one or more first functional system lines 162a, 162b (e.g., as shown in FIG. 1). The housing 114 can include one or more second functional system ports 164a, 164b configured to fluidly connect to one or more second functional system lines 166a, 166b (e.g., as shown in FIG. 1). The housing 114 can include one or more the first controllable valve ports 168a, 168b configured to fluidly connect to the one or more first pressure control lines 104a, 104b (e.g., as shown in FIG. 1). The housing 114 can include one or more second controllable valve ports 170a, 170b configured to fluidly connect to the one or more second pressure control lines 108a, 108b (e.g., as shown in FIG. 1). The housing 114 can include one or more transfer control ports 172a, 172b configured to connect to the one or more third pressure control lines 153a, 153b to be in fluid communication with the transfer control valve 110.

The spool 116 can be configured to move within the housing 114 between the first position, the second position, and third position to selectively communicate the one or more first functional system ports 160a, 160b and the one or more second functional system ports 164a, 164b with the one or more first controllable valve ports 168a, 168b or the one or more second controllable valve ports 170a, 170b as a function of a pressure differential between the one or more transfer control ports 172a, 172b.

In certain embodiments, in the first position (e.g., as shown in FIGS. 1-4), the spool 116 can be configured to fluidly communicate the one or more first functional system ports 160a, 160b to the one or more the first controllable valve ports 168a, 168b and the one or more second functional system ports 164a, 164b to the one or more the second controllable valve ports 170a, 170b, and can be configured to block communication between the one or more first functional system ports 160a, 160b from the one or more second controllable valve ports 170a, 170b and the one or more second functional system ports 164a, 164b from the one or more first controllable valve ports 168a, 168b.

With reference to FIG. 5, in certain embodiments, in the second position, the spool 116 can be configured to fluidly communicate the one or more first functional system ports 160a, 160b to the one or more the first controllable valve ports 168a, 168b and the one or more first functional system ports 160a, 160b to the one or more the second controllable valve ports 170a, 170b, and can be configured to block communication between the one or more second functional system ports 164a, 164b from the one or more second controllable valve ports 170a, 170b and the one or more second functional system ports 164a, 164b from the one or more first controllable valve ports 168a, 168b.

With reference to FIG. 6, in certain embodiments, in the third position, the spool 116 can be configured to fluidly communicate the one or more second functional system ports 164a, 164b to the one or more the first controllable valve ports 168a, 168b and the one or more second functional system ports 164a, 164b to the one or more the second controllable valve ports 170a, 170b, and can be configured to block communication between the one or more first functional system ports 160a, 160b from the one or more first controllable valve ports 168a, 168b and the one or more first functional system ports 160a, 160b from the one or more second controllable valve ports 170a, 170b.

In certain embodiments, the transfer valve is centered in the first position (e.g., normal position) by the hydraulically modulating centering system. If the transfer valve moves away from the center (e.g., first position), the modulating pressure drops the pressure in one or more cavities as described (e.g., first and second cavities) above and provides a centering load on the transfer valve. The orifice (e.g., orifices 135a, 135b in FIG. 1) sizes and tolerances are arranged such that the hydraulically modulated centered position is within a small linear length. The centering system operates on a smaller area of the spool than the primary diameter of the valve so that in the event of a failure of either of the first and second controllable valves, the transfer control system can command the transfer valve to move to the second or third position, over-riding the centering system and providing backup to the system as described in detail above.

In certain embodiments, the centering system provides a weight benefit as compared to traditional systems which require springs or a modulating electro-mechanical interconnect devices (EMIDs) to accomplish a center position with no hard stop. The system as described above reduces the need for active control of the transfer valve and increases force margins for the centering system. Embodiments can provide for valve systems with reduced weight, reduced need for active control of the transfer valve, and increased force margins for the centering system. Embodiments can provide for controlling two systems (e.g., 144, 146) with one control system rather than two control systems for each of the systems.

Embodiments can include any suitable computer hardware and/or software module(s) to perform any suitable function (e.g., as disclosed herein).

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A system, comprising:
   a first controllable valve configured to output a control pressure on one or more first pressure control lines;
   a second controllable valve configured to output a control pressure on one or more second pressure control lines;
   a transfer valve in fluid communication with the first controllable valve and the second controllable valve, wherein the transfer valve is configured to move between a first position, a second position, and a third position; and includes a housing and a spool positioned within the housing and configured to move within the housing between the first position, the second position, and the third position; and
   a hydraulic centering system operatively associated with and/or forming part of the transfer valve, wherein the hydraulic centering system is configured to hydraulically bias the transfer valve in opposite directions to maintain the transfer valve in the first position, and wherein the hydraulic centering system includes:
      a first high pressure centering port defined through the housing;
      a second high pressure centering port defined through the housing; and
      at least one low pressure centering port defined through the housing between the first high pressure centering port and the second high pressure centering port,
      wherein the first high pressure centering port is configured to be in fluid communication with a first centering control pressure line, and the second high pressure centering port is configured to be in fluid communication with a second centering pressure control line.

2. The system of claim 1, wherein the spool includes a centering land extending radially outwardly from a shaft of the spool, wherein the hydraulic centering system land partially defines a first cavity on a first side of the centering land which is in fluid communication with the first high pressure centering port, and a second cavity on a second side of the centering land in fluid communication with the second high pressure centering port, wherein the centering land is configured to block the at least one low pressure centering port in the first position.

3. The system of claim 2, further including:
   a first land extending radially from the shaft of the spool to slidably seal to the housing; and
   a second land extending radially from the shaft of the spool to slidably seal to the housing, wherein the centering land is positioned between the first land and the second land, wherein the first cavity is at least partially defined between the first land and the centering land and the second cavity is at least partially defined between the centering land and the second land.

4. The system of claim 3, wherein the first land, the second land, and centering land each include a respective seal configured to seal to an inner diameter of the housing.

5. The system of claim 2, wherein the at least one low pressure centering port includes a first low pressure centering port and a second low pressure centering port positioned between the first high pressure centering port and the second high pressure centering port, wherein the first low pressure centering port and the second low pressure centering port are configured to be blocked by the centering land in the first position.

6. The system of claim 1, wherein the first position is between the second position and the third position.

7. The system of claim 6, wherein the first position is centered between the second position and the third position.

8. The system of claim 7, wherein in a first mode, a pressure differential across the transfer valve is within a first mode threshold such that the centering system maintains the transfer valve in the first position or about the first position, wherein in a second mode, the pressure differential across the transfer valve is outside the first mode threshold such that the centering system does not maintain the transfer valve in the first position and the transfer valve is moved to the second position, wherein in a third mode, the pressure differential across the transfer valve is outside the first mode threshold such that the centering system does not maintain the transfer valve in the first position and the transfer valve is moved to the third position.

9. A valve, comprising:
   a housing, wherein the housing includes a first high pressure centering port, a second high pressure centering port, and at least one low pressure centering port between the first high pressure centering port and the second high pressure centering port; and
   a spool comprising a shaft and configured to move within the housing between a first position, a second position, and a third position, and
   a hydraulic centering land operatively associated with or forming part of the spool and extending radially outward relative to the shaft of the spool, wherein the hydraulic centering land is configured to hydraulically bias the spool in the first position, wherein the first position is between the second position and the third position, wherein the centering land is configured to be between the first high pressure centering port and the second high pressure centering port.

10. The valve of claim 9, wherein the centering land partially defines a first cavity on a first side of the centering land which is in fluid communication with the first high pressure centering port, and a second cavity on a second side of the centering land in fluid communication with the second high pressure centering port.

11. The valve of claim 10, wherein the centering land is configured to block the at least one low pressure centering port in the first position.

12. The valve of claim 11, wherein the centering land is configured such that if the spool moves toward the second position, the at least one low pressure centering port is progressively exposed to the first cavity to cause a reduction in pressure in the first cavity to the second cavity, resulting in a restorative force acting on the centering system toward the first position.

13. The valve of claim 12, wherein the centering land is configured such that if the spool moves toward the third position, the at least one low pressure centering port is progressively exposed to the second cavity to cause a reduction in pressure in the second cavity to the first cavity, resulting in the restorative force acting on the centering system toward the first position.

14. The valve of claim 9, further including a seal on an outer surface of the centering land, to seal against the housing to prevent leakage to the at least one low pressure centering port.

15. A valve, comprising:
 a housing, wherein the housing includes a first high pressure centering port, a second high pressure centering port, and at least one low pressure centering port between the first high pressure centering port and the second high pressure centering port;
 a spool configured to move within the housing between a first position, a second position, and a third position, and
 one or more hydraulic centering features associated with the housing and/or the spool and configured to hydraulically bias the spool in opposite directions via the first high pressure centering port and the second high pressure centering port to maintain the spool in the first position, wherein the first position is between the second position and the third position, and wherein the one or more hydraulic centering features include a centering land that is configured to be between the first high pressure centering port and the second high pressure centering port.

* * * * *